W. J. MONK.
FLANGE FOR WARP BEAMS.
APPLICATION FILED APR. 11, 1906.

900,294.

Patented Oct. 6, 1908.

2 SHEETS—SHEET 1.

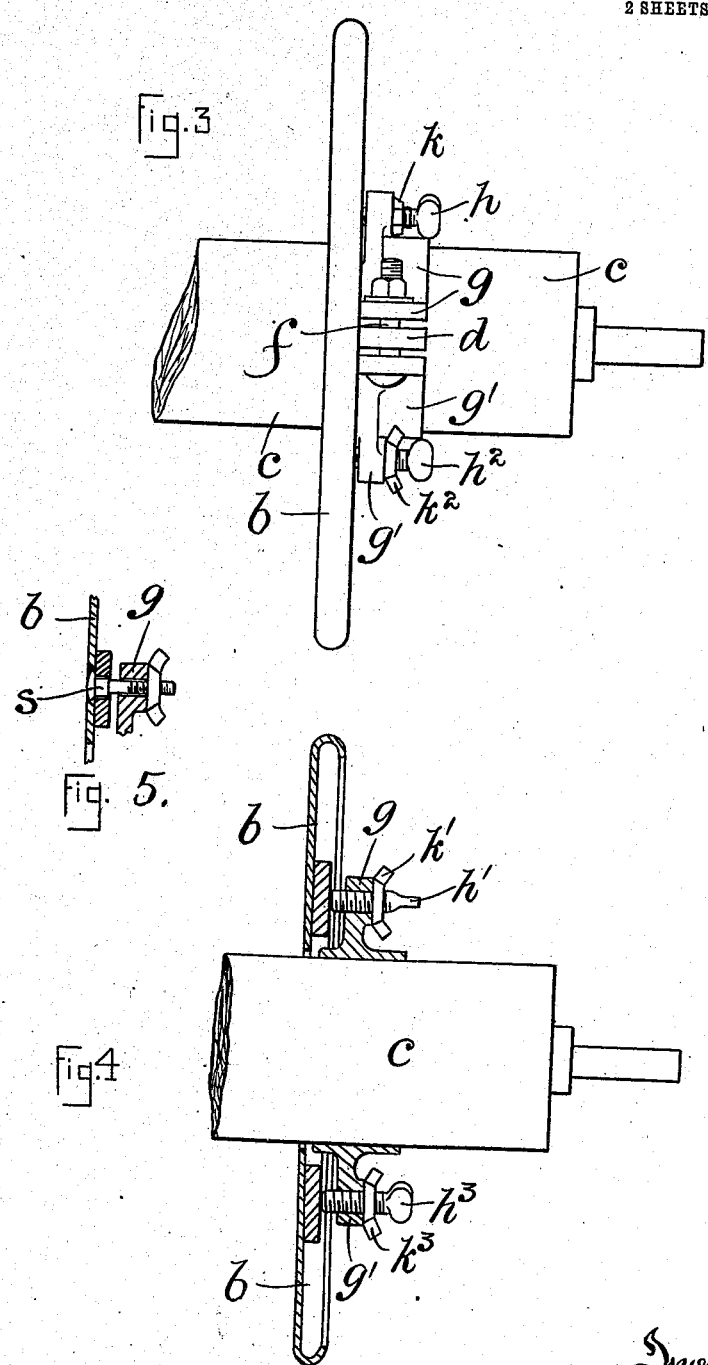

UNITED STATES PATENT OFFICE.

WILLIAM JAMES MONK, OF KEIGHLEY, ENGLAND, ASSIGNOR TO GEORGE HATTERSLEY AND SONS LIMITED, OF KEIGHLEY, ENGLAND.

FLANGE FOR WARP-BEAMS.

No. 900,294.  Specification of Letters Patent.  Patented Oct. 6, 1908.

Application filed April 11, 1906. Serial No. 311,023.

*To all whom it may concern:*

Be it known that I, WILLIAM JAMES MONK, a subject of the King of Great Britain, and resident of 252 Skipton road, Keighley, in the county of York, England, have invented a certain new and useful Improvement in Flanges for Warp-Beams, of which the following description, together with the accompanying sheets of drawings, is a specification.

In the fixing or mounting of flanges on beams which are to have warps wound upon them it is very desirable to have the inner guiding surfaces of such flange at right angles to the axis of the beam upon which they are fixed in order that the threads of warp forming the selvages of the resultant fabric when woven may be maintained in the same state of tension throughout all the weaving operations as are the other threads of warp forming the body part of the fabric.

To produce flanges which may be readily fixed in position at any part lengthwise the beam and as readily adjusted so that their inner radial surfaces may be maintained at right angles to the axis of said beam irrespective of any irregularities in the peripheral surface of such beam, is the object of my present invention.

Figure 1:
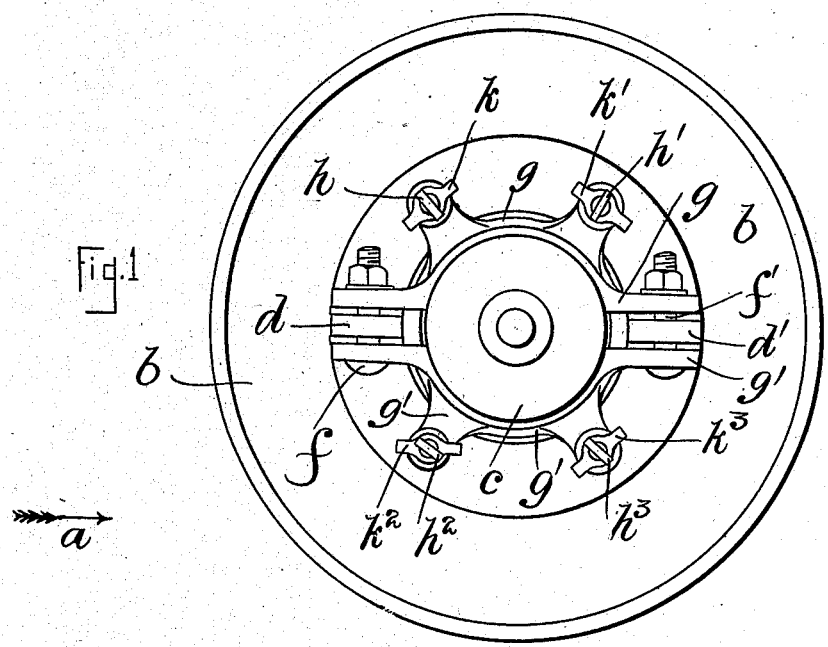
Figure 2:
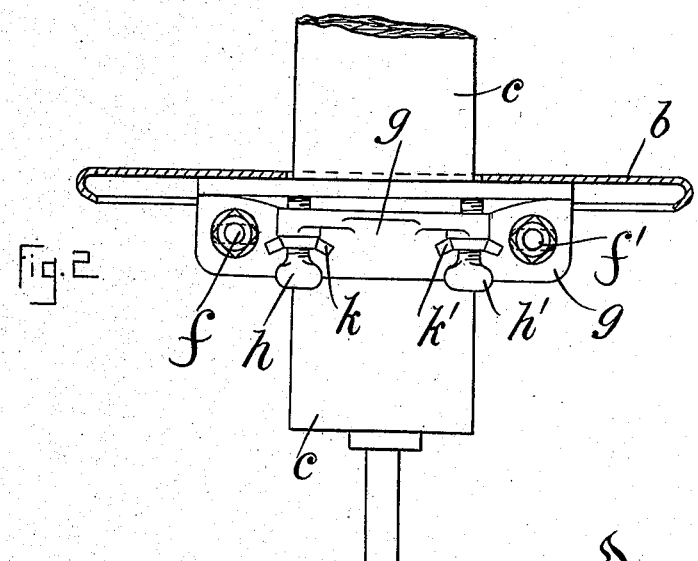

In the accompanying sheets of drawings, which are illustrative of my invention:—Figure 1 is an end view of a beam showing my improved flange mounted thereon. Fig. 2 is a plan view of parts illustrated by Fig. 1 and shows the flange partly in section. Fig. 3 is a view of the parts shown by Fig. 1 as seen in the direction indicated by arrow $a$. Fig. 4 is a similar view to Fig. 3 but shows the flange in section. Fig. 5 is a sectional view of a part hereinafter explained.

To attain the object of my invention I construct the radiating part or disk $b$ of the flange so that it will entirely encircle the beam $c$ while projections $d$, $d'$ which extend laterally from such flange $b$ have openings made through them to receive bolts $f$, $f'$ which also pass through clamping pieces $g$, $g'$ so as when screwed up to press and bind these latter firmly against the peripheral surface of the beam $c$ and that at any part of its length, thus said flange $b$ may be readily fixed in position on the beam $c$ to suit any width of warp. The clamping pieces $g$, $g'$ are so constructed or shaped that set screws $h$, $h'$, $h^2$, $h^3$ may be mounted upon them to press upon the flange $b$ in order to adjust this latter in a direction lengthwise the beam $c$ by which means its position at right angles to the axis of said beam $c$ may readily be secured irrespective of any unevenness that may exist on the beam's peripheral surface.

I may here observe that instead of making use of the set screws $h$, $h'$, $h^2$, $h^3$ I may make use of bolts $s$ which will pull upon or force the flange $b$ (said bolts passing through the openings left vacant by the set screws which they displace, as shown by Fig. 5) in a direction lengthwise the beam $c$ to effect the same adjusting actions as do the said set screws $h$, $h'$, $h^2$, $h^3$, however I preferably make use of these latter and employ locknuts $k$, $k'$, $k^2$, $k^3$ for securing them when adjusted in position.

Such being the nature and object of my invention, what I claim is:—

1. The combination with a warp beam, and a flange loosely mounted thereon, said flange being provided with lateral projections, of a sectional clamping ring adapted to engage with said projections and also said beam, said clamping ring being also provided with means for adjusting said flange longitudinally relatively to said beam.

2. The combination with a warp beam, and a flange loosely mounted thereon, said flange being provided with inwardly projecting members, of a sectional clamping ring mounted on said beam and adapted to clamp said projecting members between its sections, said clamping ring being also provided with outstanding portions carrying means for adjusting said flange longitudinally relatively to said beam.

In testimony whereof I have affixed my signature in presence of two witnesses.

WILLIAM JAMES MONK.

Witnesses:
 GEO. P. HOLMES,
 SAMUEL HEY.